(12) United States Patent
Marissal et al.

(10) Patent No.: US 6,489,409 B2
(45) Date of Patent: Dec. 3, 2002

(54) PROCESS FOR MANUFACTURING OLEFIN POLYMERS

(75) Inventors: Daniel Marissal, Braine-le-Comte (BE); Brent Walworth, Gentbrugge (BE)

(73) Assignee: Solvay Polyolefins Europe-Belgium (Societe Anonyme), Brussels (BE)

( * ) Notice: Subject to any disclaimer, the term of this patent is extended or adjusted under 35 U.S.C. 154(b) by 16 days.

(21) Appl. No.: 09/753,670

(22) Filed: Jan. 4, 2001

(65) Prior Publication Data

US 2001/0018500 A1 Aug. 30, 2001

(30) Foreign Application Priority Data

Jan. 18, 2000 (BE) .......................................... 2000/0036

(51) Int. Cl.⁷ .................................................. C08F 2/04
(52) U.S. Cl. ...................... 526/70; 526/64; 526/348.2; 526/348.5; 526/348.6; 422/131
(58) Field of Search .......................... 526/70, 64, 348.2, 526/348.5, 348.6; 422/131

(56) References Cited

U.S. PATENT DOCUMENTS 3,816,383 A * 6/1974 Stotko ........................ 260/94.9

| | | |
|---|---|---|
| 4,692,501 A | 9/1987 | Mineshima et al. |
| 5,639,834 A | 6/1997 | Debras et al. |
| 5,723,705 A | 3/1998 | Herrmann et al. |

FOREIGN PATENT DOCUMENTS

| | | |
|---|---|---|
| EP | 0 432 555 A2 | 6/1991 |
| EP | 0891990 A2 * | 1/1999 |
| EP | 0 897 934 A1 | 2/1999 |
| GB | 850 002 | 9/1960 |
| GB | 1147019 | 4/1969 |
| JP | 3-084013 | 4/1991 |

* cited by examiner

Primary Examiner—David W. Wu
Assistant Examiner—William K Cheung
(74) Attorney, Agent, or Firm—Oblon, Spivak, McClelland, Maier & Neustadt, P.C.

(57) ABSTRACT

Process for manufacturing olefin polymers, in which some of the suspension of olefin polymer particles formed in a diluent is drawn off from the polymerization reactor and diluted by means of a liquid before being sent into a hydrocyclone separator in which, on the one hand, a concentrated suspension of polymer particles and, on the other hand, a stream essentially comprising diluent are formed and separated.

9 Claims, 3 Drawing Sheets

PROCESS FOR MANUFACTURING OLEFIN POLYMERS

BACKGROUND OF THE INVENTION

Field of the Invention

The present invention relates to a process for manufacturing olefin polymers in suspension in a diluent. The invention also relates to a plant used for carrying out the process.

Patent Application EP 0 891 990 describes a continuous olefin polymerization process in which a suspension comprising up to 52% by weight of polyethylene particles in isobutane is formed in the polymerization reactor and is continuously withdrawn therefrom. This process has the disadvantage that the suspension withdrawn from the reactor still contains a large amount of diluent and of other reactants, such as the monomer, which it is then necessary to subsequently separate from the polymer particles and to treat for the purpose of reusing it in the reactor.

Several techniques used for further concentrating a suspension of polymer particles which has been withdrawn from a polymerization reactor have been described. On an industrial scale, it is general practice to use several settling legs which are mounted directly on the polymerization reactor and are periodically filled and discharged in a sequential manner. However, this process has drawbacks in that the periodic discharging from the reactor is difficult from the safety and reliability standpoints. This is because it is known that the valves isolating the settling legs readily become blocked over time. U.S. Pat. No. 3,816,383 and GB 1 147 019 describe continuous olefin polymerization processes in which a suspension of polyethylene particles, withdrawn from a reactor, is concentrated by means of a hydrocyclone separator, and then a fraction of the concentrated suspension is drawn off for the purpose of recovering the polyethylene produced, the other fraction being recycled to the reactor. These processes have the drawback that the suspension drawn off contains relatively large amounts of diluent and of monomer compared with the amount of polymer produced, these having to be separated and subsequently treated.

The object of the present invention is to provide a process which does not have the aforementioned drawbacks and which makes it possible, in particular, to considerably reduce the amounts of diluent and other reactants to be separated from the polymer particles. The invention therefore relates to a process for manufacturing olefin polymers, in which:

(a) at least one olefin is continuously polymerized in a polymerization reactor in the presence of a diluent (D) in order to produce a suspension (S) comprising the said diluent (D) and olefin polymer particles;

(b) some of the said suspension (S) is drawn off from the reactor;

(c) the suspension drawn off is diluted by means of a liquid (L) so as to obtain a dilute suspension (DS);

(d) the dilute suspension (DS) is sent into a hydrocyclone separator in which, on the one hand, a concentrated suspension (CS) of polymer particles and, on the other hand, a stream (F) comprising diluent (D) are formed and separated;

(e) the stream (F) is drawn off from the hydrocyclone separator and at least partially recycled to the polymerization reactor;

(f) the concentrated suspension (CS) is drawn off from the hydrocyclone separator; and (g) the olefin polymer particles are separated from the concentrated suspension (CS).

It has been found, surprisingly, that diluting the suspension (S) coming from the polymerization reactor by means of a liquid (L) makes it possible to considerably increase the efficiency of the hydrocyclone separator while at the same time allowing very concentrated suspensions of polymer particles to be obtained at the outlet of the hydrocyclone separator. In the present invention, the term "liquid (L)" is understood to mean any compound which is liquid under the temperature and pressure conditions used in the polymerization reactor and in which most of the olefin polymer formed is insoluble under these polymerization conditions.

According to a first method of implementing the process according to the invention, the liquid (L) added in step (c) to the suspension (S) drawn off from the polymerization reactor consists essentially of diluent (D). The amount of diluent added as liquid (L) in this first method of implementing the process may vary widely. In general, the amount of diluent added to the suspension is at least 0.1 l, preferably at least 0.5 l, per kg of polymer particles present in the suspension (S) drawn off from the reactor. The amount of diluent added generally does not exceed 5 l, and preferably does not exceed 3 l, per kg of polymer particles present in the suspension (S) drawn off from the reactor.

This first method of implementing the process has the additional advantage that the concentration of residual olefin in the concentrated suspension (CS) drawn off downstream of the hydrocyclone separator decreases strongly compared with its polymer particle content and its diluent content. Consequently, the purification and repressurization of the diluent, for the purpose of reusing it in the reactor, are greatly simplified and more economic. In addition, the amount of olefin to be recovered from the concentrated suspension is greatly decreased and therefore the recovery is also simplified and more economic.

According to a second method of implementing the process according to the invention, the liquid (L) added in step (c) to the suspension (S) drawn off from the polymerization reactor consists essentially of at least part of the stream (F). In this second method of implementing the process according to the invention, the amount of stream (F) added to the suspension drawn off from the reactor during step (c) may vary widely. In general, the amount of stream (F) thus added to the suspension is at least 0.1 l, preferably at least 1 l, per kg of polymer particles present in the suspension (S) drawn off from the reactor. The amount of stream (F) added generally does not exceed 20 l, preferably does not exceed 10 l, per kg of polymer particles present in the suspension (S) drawn off from the reactor. The fraction of the stream (F) used as liquid (L) is in general between 10 and 99% by weight, the balance being recycled to the polymerization reactor. Preferably, the fraction of the stream (F) used as liquid (L) is at least 25% by weight. Preferably, the fraction of the stream (F) used as liquid (L) does not exceed 95% by weight.

This second method of implementing the process has the additional advantage that the efficiency of the hydrocyclone separator can be varied by modifying the fraction of the stream (F) used as liquid (L). In fact, increasing the fraction of the stream (F) recycled as liquid (L) allows the efficiency of the hydrocyclone separator to be improved. Decreasing the fraction of the stream (F) recycled as liquid (L) reduces the separating power of the hydrocyclone separator so that certain fine polymer particles are entrained by the stream (F)

and therefore recycled to the polymerization reactor, this having the effect of increasing the productivity of the catalyst. Another advantage of this second method of implementing the process resides in the fact that controlling the amount of the stream (F) recycled as liquid (L) allows the concentration of polymer particles present in the polymerization reactor to be adjusted. Thus, it is possible to work at relatively low polymer concentrations in the polymerization reactor while maintaining a high polymer concentration at the output end of the process.

According to a third method of implementing the process according to the invention, the liquid (L) added in step (c) to the suspension (S) drawn off from the polymerization reactor consists essentially of diluent (D) and at least part of the stream (F). In this third method of implementing the process according to the invention, the amount of stream (F) and the amount of diluent (D) are generally those described above with respect to the first and the second method of implementing the process, respectively.

The olefin used in polymerization step (a) of the process according to the invention is generally chosen from among olefins containing from 2 to 12 carbon atoms and mixtures thereof. The olefin is preferably chosen from among 1-olefins containing from 2 to 8 carbon atoms, more particularly from among ethylene, propylene, 1-butene, 1-methylpentene, 1-hexene, 1-octene and mixtures thereof. It goes without saying that in step (a) several olefins can be used together or that other monomers copolymerizable with the olefins may be used so as to obtain olefin copolymers. Among other monomers copolymerizable with olefins, mention may especially be made of conjugated or unconjugated diolefins. The process according to the invention is applicable to the production of olefin polymers. The expression "olefin polymers" is understood to mean both the homopolymers of an olefin and the copolymers of an olefin with one or more other olefins or of other monomers copolymerizable with the olefin. The process is particularly well suited for obtaining ethylene polymers and propylene polymers, and more particularly for obtaining ethylene homopolymers and ethylene copolymers comprising less than 5% by weight of at least one other olefin containing from 3 to 8 carbon atoms.

The diluent (D) used in the process according to the invention may be any diluent which is liquid under the polymerization conditions and in which most of the polymer formed is insoluble under the polymerization conditions. Suitable diluents are hydrocarbons. Aromatic and cyclic aliphatic hydrocarbons containing from 5 to 12 carbon atoms, such as toluene and cyclohexane, are very suitable. Preferred diluents are acyclic aliphatic hydrocarbons containing from 3 to 8 carbon atoms, such as pentane and hexane. Propane and isobutane are particularly preferred.

In one particular case, the diluent may be the olefin itself maintained in the liquid state below its saturation pressure.

In another particular case, the diluent may be maintained in its supercritical state.

The polymerization carried out in step (a) of the process according to the invention is generally carried out in the presence of a catalyst. Any catalyst allowing olefins to be polymerized may be used. By way of examples of such catalysts, mention may be made of catalysts of the Ziegler type, catalysts based on vanadium or chromium, metallocene catalysts and those based on transition metals of Groups 8 to 12 of the Periodic Table of the Elements. These catalysts may be supported on an inorganic or polymeric support.

It goes without saying that in polymerization step (a), apart from the monomer(s) and the diluent, other compounds may be present such as, especially, cocatalysts and agents for controlling the molecular mass.

The polymerization carried out in step (a) of the process may be performed under highly varied temperature and pressure conditions. In general, the polymerization is carried out at a temperature of from 20 to 150° C., preferably from 25 to 130° C. Usually, the polymerization is carried out at a pressure of from $10^5$ to 100. $10^5$ Pa, preferably from 10. 105 to $5^5$–$10^5$ Pa.

According to a variant of the process according to the invention, the polymerization carried out in step (a) is carried out in several polymerization reactors connected in series. The use of several reactors in series is known and has, for example, been described in Patent Application EP 0 603 935. In this case, the suspension (S) drawn off from the last polymerization reactor is sent to step (b). The suspensions coming from each reactor preceding the last polymerization reactor may be drawn off and transferred in any known manner to the next reactor. For this purpose, it may also be advantageous to use hydrocyclone separators. If step (a) is carried out in several reactors in series, the stream (F) may be recycled to the last polymerization reactor. According to one advantageous embodiment, the stream (F) is recycled to a polymerization reactor preceding the last reactor.

In step (b) of the process according to the invention, some of the suspension formed in the reactor in step (a) is drawn off from this reactor. The amount of suspension drawn off from the reactor may vary widely.

In general, the amount of suspension drawn off from the reactor is adjusted so as to correspond to the production of polymer.

Apart from the diluent and the olefin polymer particles, the suspension drawn off from the reactor may contain other compounds present or formed in the polymerization reactor. In general, the suspension comprises an amount of unpolymerized olefin.

In step (b), the suspension is preferably drawn off from the polymerization reactor continuously.

The dilute suspension (DS) formed in step (c) of the process according to the invention comprises, apart from the constituents of the suspension drawn off from the polymerization reactor, the liquid (L).

According to the first method of implementing the process according to the invention, the liquid (L) consists essentially of diluent (D). In this case, the diluent added as liquid (L) may be fresh diluent, i.e. diluent not ever having been used for the polymerization, or recovered and purified diluent. The expression "recovered and purified diluent" is understood to mean diluent which has already been used for the polymerization but which is purified so as to separate therefrom most of the compounds present or formed in the polymerization reactor, such as polymer particles and olefin, so that it has a purity sufficient to be reused in the process.

According to the second method of implementing the process, the liquid (L) consists essentially of at least part of the stream (F). The stream (F) comprises, apart from the diluent, other compounds present or formed in the polymerization reactor. In general, the stream (F) comprises compounds present or formed in the reactor which are soluble in the diluent. The stream (F) usually comprises some olefin. The stream (F) may also comprise compounds present or formed in the reactor which are not soluble in the diluent, such as, for example, fine polymer particles.

According to the third method of implementing the process according to the invention, the liquid (L) consists essentially of diluent (D) and of at least part of the stream (F). In this method of implementing the process, the suspension drawn off from the reactor is preferably diluted firstly by means of diluent (D) and then by means of part of the stream (F).

In step (d) of the process according to the invention, the dilute suspension formed in step (c) is sent into a hydrocyclone separator in which, on the one hand, a concentrated suspension (CS) of polymer particles and, on the other hand, a stream (F) comprising diluent (D) are formed and separated.

For the purposes of the present invention, the term "hydrocyclone separator" is understood to mean any apparatus which, due to the action of a centrifugal force, makes it possible to separate from a suspension of solid particles, on the one hand, a liquid stream depleted in solid particles and, on the other hand, a stream richer in solid particles. Such apparatuses are well known; they have been described, for example, in Perry's Chemical Engineers' Handbook, McGraw-Hill 7th Edition, 1997, pages 19–24 to 19–28. It goes without saying that in the process according to the invention several hydrocyclone separators may be connected in series.

The pressure and temperature values in the hydrocyclone separator are generally adjusted so that most of the diluent present remains in liquid form. Preferably, the pressure and temperature are of the order of magnitude of those obtaining in the polymerization reactor.

In step (e) of the process according to the invention, the stream (F) is drawn off from the hydrocyclone separator and at least partially recycled to the polymerization reactor. In the first method of implementing the process according to the invention, all of the stream (F) is generally recycled to the reactor. In the second and third methods of implementing the process, at least part of the stream (F) is used as liquid (L) in step (c) of the process. In this case, the balance of the stream (F) is generally recycled to the reactor.

In step (f) of the process according to the invention, the concentrated suspension (CS) is drawn off from the hydrocyclone separator. The concentrated suspension drawn off from the hydrocyclone separator comprises polymer particles and diluent.

In step (g) of the process according to the invention, the olefin polymer particles are separated from the concentrated suspension (CS). This separation may be carried out by any known method. The polymer particles are generally separated from most of the diluent by subjecting the concentrated suspension (CS) coming from step (f) of the process according to the invention to a treatment under temperature and pressure conditions suitable for vaporizing at least some of the diluent. The polymer particles now containing only a small amount of residual diluent can then be dried by any known means, for example by heating them in a dryer.

According to a first alternative version of step (g) of the process according to the invention, the pressure on the concentrated suspension (CS) is relieved to a pressure of less than $5·10^5$ Pa. The vaporized diluent can then be recondensed by compression for the purpose of reusing it in the process according to the invention. Before it is reused, the diluent is normally purified so as to remove most of the olefin and possibly the other compounds present. After purification, the diluent can be reused in steps (a) and/or (c) of the process according to the invention.

According to a second alternative version of step (g) of the process according to the invention, the pressure on the concentrated suspension (CS) is relieved under temperature and pressure conditions which ensure that most of the diluent vaporizes, but which are such that the subsequent cooling of the vaporized diluent to a temperature of less than or equal to 60° C. allows it to be recondensed without any compression. The temperature at which the pressure relief is carried out is generally between 50 and 90° C. In order to adjust the temperature at which the pressure relief is carried out, it may be advantageous to heat the concentrated suspension coming from the hydrocyclone separator by means of a line heater. The pressure is generally reduced to between $5·10^5$ and $20·10^5$ Pa. This alternative version of the process has the advantage that the diluent thus separated from the polymer particles can be recondensed simply by cooling, without any compression step, and can be reused in step (a) of the process according to the invention. This second alternative version of step (g) of the process is highly advantageous when a diluent is used which has a boiling point at atmospheric pressure of less than about 25° C.

The process according to the invention furthermore has the advantage that it makes it possible to obtain polymers having a narrower particle size distribution and greater homogeneity in their rheological properties.

The invention also relates to a plant used for carrying out the process described above, comprising a continuously operating polymerization reactor, a device used for adding liquid (L), a hydrocyclone separator, a device for drawing off the concentrated suspension (CS), a circuit for recycling the stream (F) to the reactor, and a device used for separating the olefin polymer particles from the concentrated suspension (CS).

As polymerization reactor, it is possible to use any continuously operating reactor, such as reactors of the stirred-vessel type or reactors of the loop type. Good results have been obtained with loop reactors.

In the process according to the invention, the stream (F) may be drawn off from the hydrocyclone separator and recycled to the reactor by benefiting from a pressure difference obtaining in the polymerization reactor. More particularly, when the polymerization reactor is a reactor of the loop type, the suspension (S) may be drawn off from the reactor and the stream (F) may be recycled to the reactor by benefiting from the pressure difference obtaining downstream and upstream of the system for stirring the loop reactor. However, it is preferred to draw off the stream (F) from the hydrocyclone separator by creating a pressure difference upstream and downstream of the hydrocyclone separator by means of a circulating pump. The pump is preferably mounted in the circuit for recycling the stream (F) to the reactor.

BRIEF DESCRIPTION OF THE DRAWINGS

FIG. 1 illustrates schematically the first method of implementing the process according to the invention. FIG. 2 illustrates schematically the second method of implementing the process and FIG. 3 the third method of implementing the process according to the invention.

Figure 1:
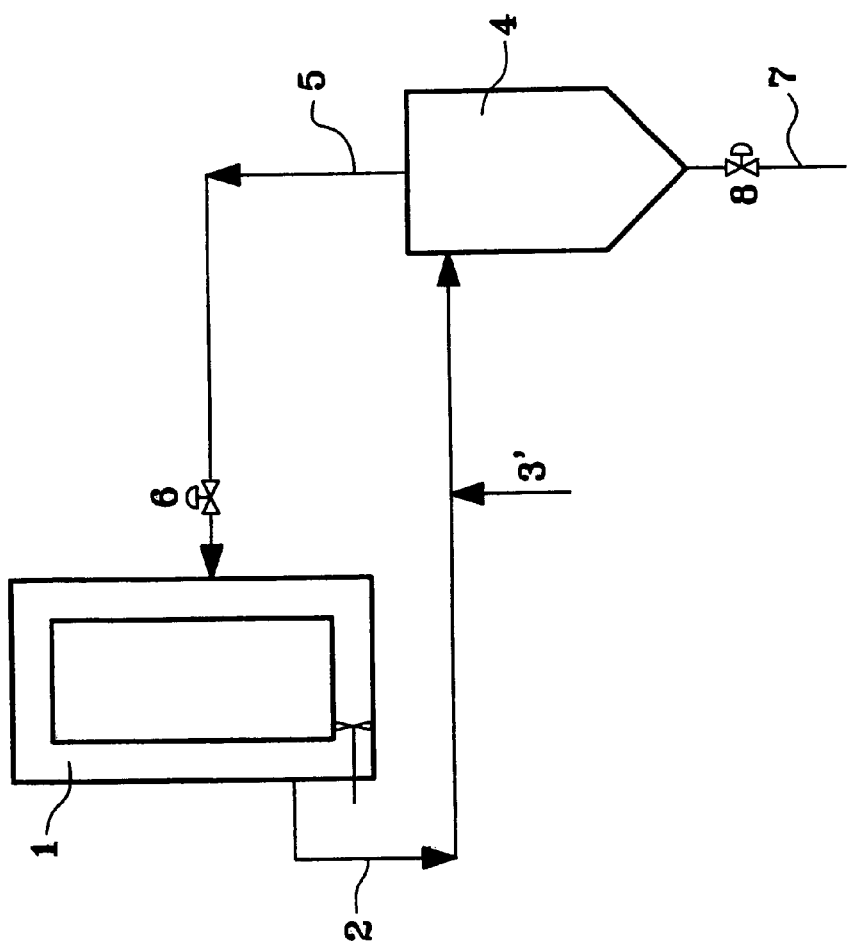
FIGS. 1 to 3 show schematically the embodiments of the plant that can be used for carrying out the process according to the invention.
Figure 2:
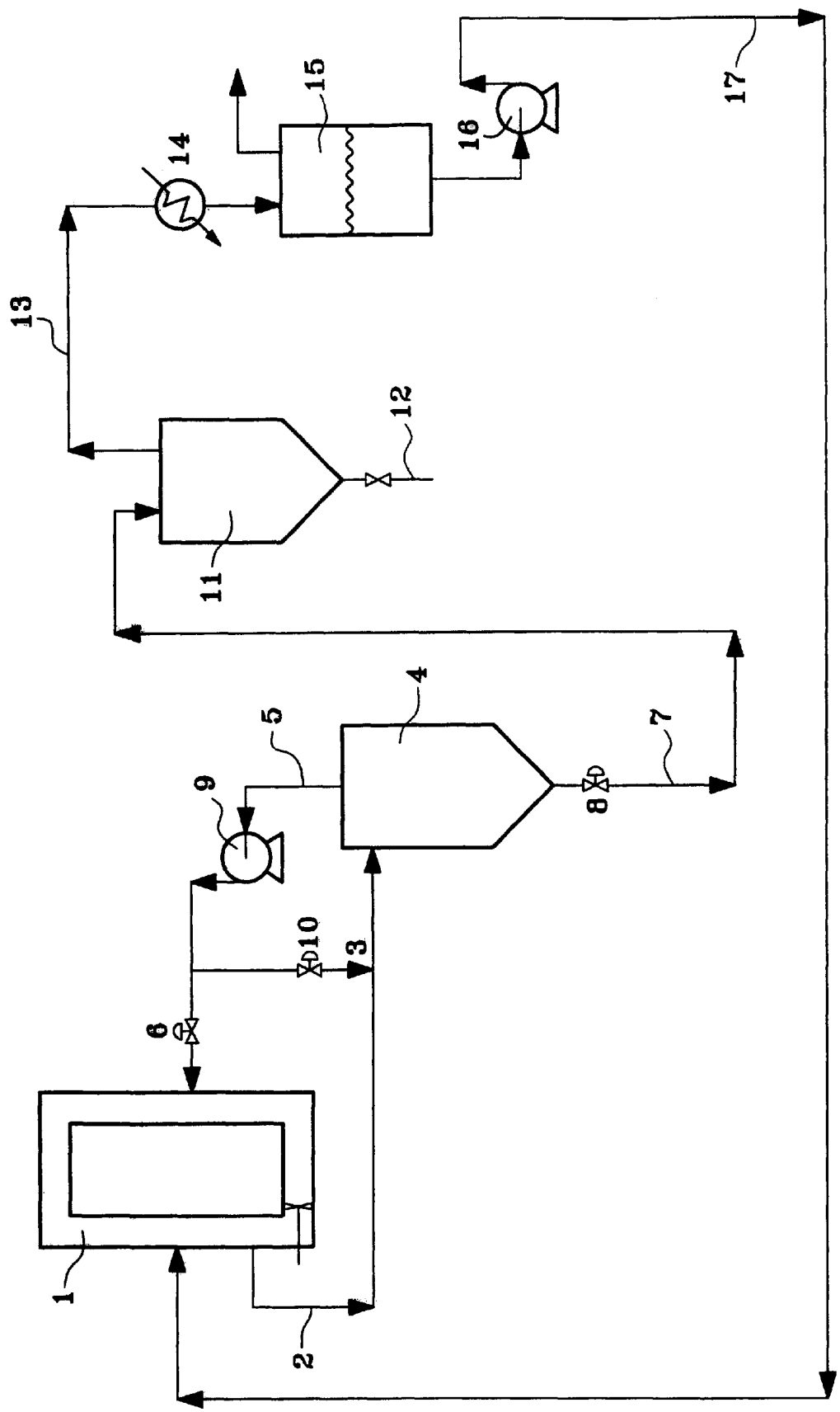
Figure 3:
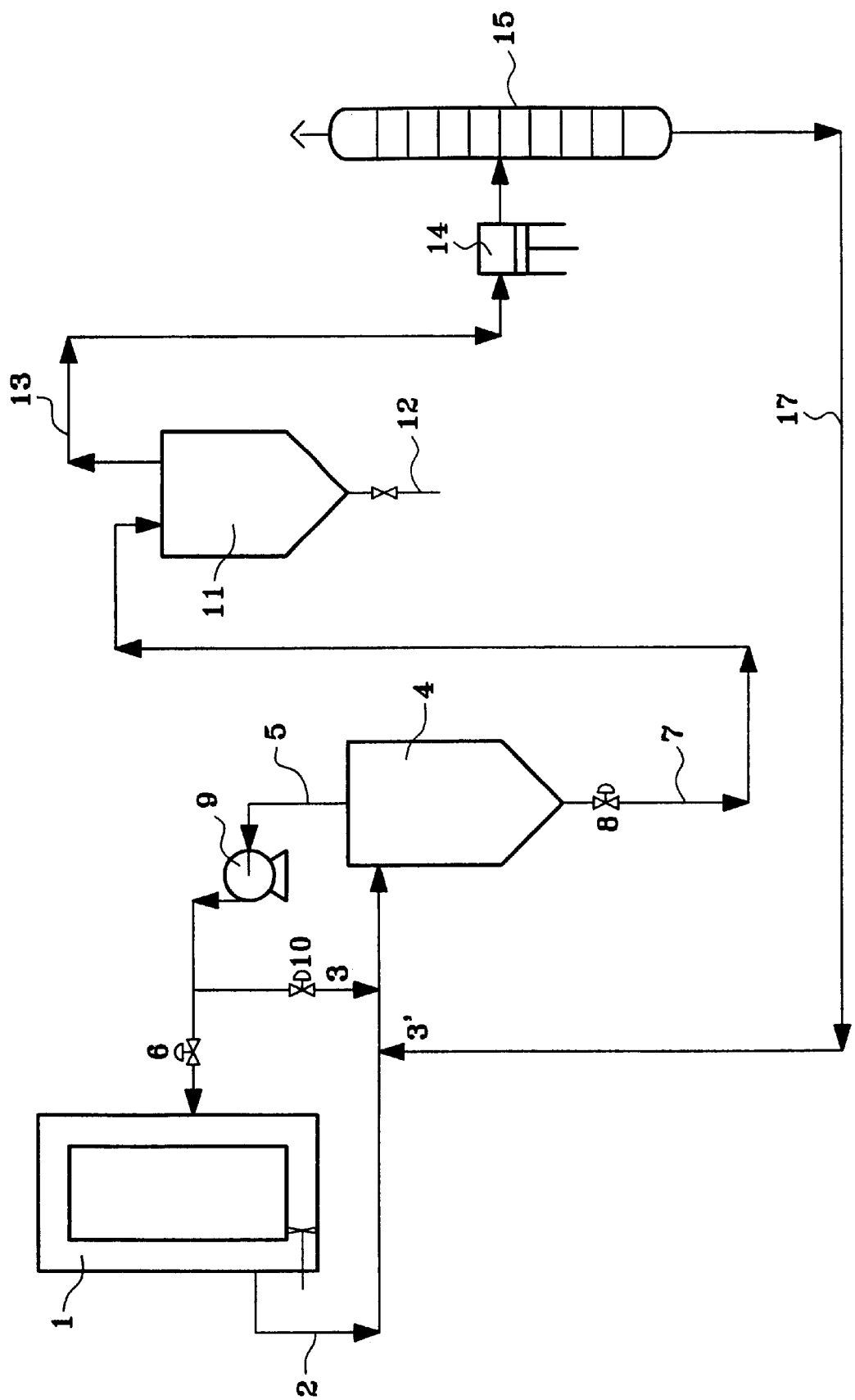

In the drawings in FIGS. 1 to 3, some of the suspension comprising polymer particles and diluent, formed in the polymerization reactor 1, is drawn off via the line 2.

In the diagram in FIG. 1, diluent is added via the line 3' and the dilute suspension is sent into the hydrocyclone separator 4 in which, on the one hand, a concentrated suspension of polymer particles which is drawn off from the hydrocyclone separator 4 by the valve 8 mounted in the line 7 and, on the other hand, a stream (F) enriched in diluent are formed. This stream (F) enriched in diluent is drawn off from the hydrocyclone separator 4 via the line 5 and recycled to the polymerization reactor. Opening the control valve 6 mounted in the line 5 allows the degree of thickening of the concentrated suspension to be conditioned. Controlling the amount of the stream (F) recycled to the reactor makes it possible to adjust the concentration of polymer particles present in the polymerization reactor. It is therefore possible to work at relatively low polymer concentrations in the polymerization reactor while maintaining a high polymer concentration at the output end of the process.

In FIG. 1, the separating of the polymer particles from the concentrated suspension drawn off by the valve 8 mounted in the line 7 has not been shown.

In the diagram in FIG. 2, the suspension drawn off from the polymerization reactor 1 is sent to the hydrocyclone separator 4 by means of a pump 9 mounted in the line 5 leaving the hydrocyclone separator 4. The suspension drawn off from the reactor 1 is diluted via the line 3 by means of at least part of the stream (F) enriched with diluent leaving the hydrocyclone separator via the line 5. Opening the control valves 6 and 10 makes it possible to adjust the respective proportions of stream (F) which are recycled to the reactor and used for diluting the suspension drawn off from the reactor. Opening the said valves also allows the proportion of fines in the stream (F) to be adjusted.

The concentrated suspension drawn off from the hydrocyclone separator via the line 7 is sent into a tank 11 maintained under a pressure of less than that obtaining in the hydrocyclone separator (generally about $5 \cdot 10^5$ to $15 \cdot 10^5$ Pa) so as to vaporize therein most of the diluent. For this purpose, the line 7 may optionally be provided with a line heater. The diluent vaporized is then sent via the line 13 provided with a heat exchanger to a tank 15 so as to condense it simply by cooling. Next, the condensed diluent is sent via the pump 16 and the line 17 to the reactor 1 as diluent in the polymerization reactor 1. The polymer particles are drawn off via the line 12.

In the diagram in FIG. 3, the suspension drawn off from the polymerization reactor 1 is sent to the hydrocyclone separator 4 by means of a pump 9 mounted in the line 5 leaving the hydrocyclone separator 4. The suspension drawn off from the reactor 1 is diluted by means of diluent via the line 3' and, via the line 3, by means of at least part of the stream (F) enriched with diluent leaving the hydrocyclone separator via the line 5. Opening the control valves 6 and 10 makes it possible to adjust the respective proportions of stream (F) which are recycled to the reactor and used for diluting the suspension drawn off from the reactor. Opening the said valves also allows the proportion of fines in the stream (F) to be adjusted.

The concentrated suspension drawn off from the hydrocyclone separator via the line 7 is sent into a tank 11 maintained at a pressure of less than that obtaining in the hydrocyclone separator (generally less than $5 \cdot 105$ Pa) so as to vaporize therein most of the diluent. The vaporized diluent is then sent via the line 13 to a compressor 14 so as to condense it by compression. The diluent thus condensed is then sent to a distillation column 15 so as to remove the monomer therefrom. The diluent depleted in monomer is then reused as diluent via the line 17 and 3'. The polymer particles are drawn off via the line 12.

EXAMPLE 1

A polymerization trial was carried out with the process according to the invention and 5 in the plant described in FIG. 1. Ethylene was continuously polymerized in a loop reactor 1 charged with isobutane by means of a chromium catalyst supported on silica so as, to form a suspension comprising about 50% by weight of polyethylene particles. The temperature in the reactor was about 100° C.; the pressure was about 40105 Pa. The reactor was fed continuously with ethylene at a rate of 10 tonnes/h. Some of the suspension of polymer particles formed in the reactor was drawn off continuously from the reactor 1 via the line 2 at a rate of 20 tonnes/h. This suspension drawn off was continuously diluted with isobutane added via the line 3 at a rate of 7 tonnes/h. The suspension thus diluted comprised approximately 37% by weight of polymer particles. It was sent continuously into a hydrocyclone separator 4. The operation of the hydrocyclone separator was adjusted by means of control valves 6 and 8 so as to obtain a stream (F) leaving the hydrocyclone separator via the line 5 at a rate of 10 tonnes/h and a concentrated suspension leaving the hydrocyclone separator via the line 7 at a rate of 17 tonnes/h. The stream (F) was entirely recycled to the polymerization reactor 1; it comprised essentially isobutane. The concentrated suspension comprised 59% by weight of polymer particles and had an ethylene content of 6% by volume. For a production of 10 tonnes of polyethylene per hour, the amounts of isobutane and ethylene to be separated from the polymer particles and to be treated, so as to reuse them, were approximately 6.6 tonnes/hour and 0.2 tonnes/hour, respectively.

EXAMPLE 2
(Not According to the Invention)

The process described in Example 1 was repeated except that the suspension drawn off from the polymerization reactor was not diluted by means of isobutane. The suspension drawn off from the polymerization reactor 1, comprising approximately 50% by weight of polymer particles, was sent directly into the hydrocyclone separator 4. The operation of the hydrocyclone separator was adjusted by means of the control valves 6 and 8 so as to obtain a concentrated suspension leaving the hydrocyclone separator via the line 7 at a rate of 17 tonnes/h, comprising 59% by weight of polymer particles. The stream (F) leaving the hydrocyclone separator via the line 5 at a rate of 3 tonnes/h was entirely recycled to the polymerization reactor 1; it comprised essentially isobutane. The concentrated suspension had an ethylene content of 10% by volume. For a production of 10 tonnes of polyethylene per hour, the amounts of isobutane and ethylene to be separated and to be treated, so as to reuse them, were approximately 6.6 tonnes/hour and 0.33 tonnes/hour, respectively.

Comparing Examples 1 and 2 shows that the process according to the invention makes it possible to obtain a concentrated suspension of polymer 2-particles having a greatly reduced ethylene content. In this way, the amount of ethylene to be subsequently separated from the polymer particles and from the diluent is greatly reduced.

EXAMPLE 3
(Not According to the Invention)

The process described in Example 1 was repeated except that the transfer into a hydrocyclone separator was omitted.

The suspension drawn off from the polymerization reactor comprised approximately 50% by weight of polymer particles. For a production of 10 tonnes of polyethylene per hour, the amounts of isobutane and ethylene to be recycled were approximately 10 tonnes/hour and 0.5 tonnes/hour, respectively.

EXAMPLE 4
(Not According to the Invention)

The process described in Example 1 was repeated except that the suspension was drawn off from the polymerization reactor by means of settling legs and the hydrocyclone separator was omitted. The suspension thus drawn off from the reactor comprised approximately 55% by weight of polymer particles. For a polymer particle productivity of 10 tonnes/h, the amounts of isobutane and ethylene to be recycled were 8.2 tonnes/h and 0.4 tonnes/h, respectively.

Comparing Examples 1, 3 and 4 shows that, for the same hourly polymer productivity, the process according to the invention makes it possible to considerably reduce the amounts of diluent and olefin to be separated from the polymer particles and to be treated for the purpose of reusing them in the process.

What is claimed is:

1. A process for manufacturing olefin polymers comprising,
    (a) at least one olefin is continuously polymerized in a polymerization reactor in the presence of a diluent (D) in order to produce a suspension (S) comprising said diluent (D) and olefin polymer particles;
    (b) some of the suspension (S) is drawn off from the reactor;
    (c) the suspension drawn off is diluted by means of a liquid (L) so as to obtain a dilute suspension (DS);
    (d) the dilute suspension (DS) is sent into a hydrocyclone separator in which a concentrated suspension (CS) of polymer particles and a stream (F) comprising diluent (D) are formed and separated;
    (e) the stream (F) is drawn off from the hydrocyclone separator; and
    (f) the olefin polymer particles are separated from the concentrated suspension (CS).

2. The process according to claim 1, wherein the liquid (L) added in step (c) consists essentially of diluent (D).

3. The process according to claim 1, wherein the liquid (L) added in step (c) consists essentially of at least part of the stream (F).

4. The process according to claim 1, wherein the liquid (L) added in step (c) consists essentially of diluent (D) and at least part of the stream (F).

5. The process according to claim 1, wherein the diluent (D) is an acyclic aliphatic hydrocarbon containing from 3 to 8 carbon atoms.

6. The process according to claim 5, wherein the diluent (D) is isooctane or propane.

7. The process according to claim 1, wherein, in step (g), the concentrated suspension (CS) is subjected to a treatment under temperature and pressure conditions which ensure that at least some of the diluent (D) vaporizes.

8. The process according to claim 7, wherein the diluent (D) is vaporized under temperature and pressure conditions such that the subsequent cooling of the diluent to a temperature of less than or equal to 60° C. allows it to be recondensed without any compression.

9. The process according to claim 1, wherein the process is applied to the production of ethylene polymers.

* * * * *